(12) United States Patent
Liang et al.

(10) Patent No.: US 10,451,213 B2
(45) Date of Patent: Oct. 22, 2019

(54) SUPPORTING STAND

(71) Applicant: Wistron Corporation, New Taipei (TW)

(72) Inventors: Chen-Yi Liang, New Taipei (TW); Chun-Yi Lu, New Taipei (TW); Chun-Chien Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/403,186

(22) Filed: Jan. 11, 2017

(65) Prior Publication Data
US 2018/0087712 A1    Mar. 29, 2018

(30) Foreign Application Priority Data
Sep. 23, 2016   (TW) .............................. 105130763 A (51) Int. Cl.
*F16M 11/18*   (2006.01)
*F16M 11/04*   (2006.01)
*F16M 11/10*   (2006.01)

(52) U.S. Cl.
CPC .......... *F16M 11/18* (2013.01); *F16M 11/046* (2013.01); *F16M 11/10* (2013.01); *F16M 2200/041* (2013.01); *F16M 2200/047* (2013.01)

(58) Field of Classification Search
CPC ...... F16M 11/18; F16M 11/046; F16M 11/10; F16M 2200/041; F16M 2200/047; F16M 11/04
USPC .......... 248/422, 287.1, 286.1, 919–920, 923, 248/133, 371, 372.1, 398, 123.11
See application file for complete search history.

(56) References Cited

U.S. PATENT DOCUMENTS

| | | | | |
|---|---|---|---|---|
| 5,537,127 A * | 7/1996 | Jingu | ...................... | A47B 21/00 248/921 |
| 5,544,594 A * | 8/1996 | Schairbaum | .......... | A47B 21/007 108/50.01 |
| 6,163,451 A * | 12/2000 | Chiu | ...................... | F16M 11/10 248/419 |
| 6,381,125 B1 * | 4/2002 | Mizoguchi | ................ | G06F 1/16 312/223.1 |

(Continued)

FOREIGN PATENT DOCUMENTS

| CN | 202746886 | 2/2013 |
|---|---|---|
| CN | 202852353 | 4/2013 |

(Continued)

OTHER PUBLICATIONS

Jinjie Jiang et al., the figure 1. of "Dual-track manually-adjusted mounting rack for flat panel TV," China patent publication No. 202361034, Aug. 1, 2012, pp. 1-3.

(Continued)

*Primary Examiner* — Christopher Garft
(74) *Attorney, Agent, or Firm* — JCIPRNET (57) ABSTRACT

A supporting stand includes a base and a bracket. The base has a sliding rail structure, and the sliding rail structure includes a first rail and a second rail. The bracket is slidably disposed on the sliding rail structure and adapted to slide along the first rail and the second rail. When the bracket slides along the first rail, the bracket moves upward or downward, and when the bracket slides along the second rail, a tilting angle of the bracket relative to the base is changed.

9 Claims, 11 Drawing Sheets

(56) References Cited

U.S. PATENT DOCUMENTS

| | | | |
|---|---|---|---|
| 7,187,538 B2* | 3/2007 | Homer | G06F 1/1616 16/221 |
| 7,874,530 B2* | 1/2011 | Kim | F16M 11/046 248/123.11 |
| 8,154,868 B2* | 4/2012 | Xu | G06F 1/1681 248/917 |
| 8,480,051 B2* | 7/2013 | Muhlberger | B60N 2/3065 248/155.3 |
| 9,179,559 B1 | 11/2015 | Kim | |
| 2007/0181755 A1* | 8/2007 | Oh | F16M 11/10 248/176.1 |
| 2009/0038422 A1* | 2/2009 | Choi | B60R 11/0235 74/89.17 |
| 2009/0057514 A1* | 3/2009 | Oh | F16M 11/08 248/282.1 |
| 2017/0016569 A1* | 1/2017 | Balch | F16M 11/10 |
| 2017/0232844 A1* | 8/2017 | Sugiyama | B60K 35/00 248/27.1 |

FOREIGN PATENT DOCUMENTS

| | | |
|---|---|---|
| TW | I333139 | 11/2010 |
| TW | I386054 | 2/2013 |
| TW | I524315 | 3/2016 |
| TW | I529313 | 4/2016 |

OTHER PUBLICATIONS

"Office Action of Taiwan Counterpart Application," dated Jun. 15, 2017, with English translation thereof, p. 1-p. 6, in which the listed references were cited.

"Office Action of China Counterpart Application," dated May 17, 2019, p. 1-p. 9.

* cited by examiner

SUPPORTING STAND

CROSS-REFERENCE TO RELATED APPLICATION

This application claims the priority benefit of Taiwan application serial no. 105130763, filed on Sep. 23, 2016. The entirety of the above-mentioned patent application is hereby incorporated by reference herein and made a part of this specification.

BACKGROUND OF THE INVENTION

Field of the Invention

The invention relates to a supporting stand, and specifically relates to a supporting stand capable of adjusting height and tilting angle of an object.

Description of Related Art

Along with the development of electronics industry and display technology, flat display device and computer device using the same, such as all-in-one PC (AIO PC), have been popularized in consumer market. In order to be convenient for the user while viewing the and using the flat display device or the AIO PC, the flat display device or the AIO PC is usually supported on the desktop by a supporting stand.

Currently, most of the supporting stands used for the flat display device are only capable of adjusting height of the flat display device and are not capable of adjusting tilting angle of the flat display device. On the other hand, most of the supporting stands used for the AIO PC are only capable of adjusting tilting angle of the AIO PC and are not capable of adjusting height of the AIO PC. In other words, there is not a supporting stand on the market that has both functions of adjusting height and adjusting tilting angle. Therefore, if the two adjusting functions are integrated into a single supporting stand by a special structural design, the user will be given more freedom to adjust an electronic device on the supporting stand according to demand.

SUMMARY OF THE INVENTION

The invention provides a supporting stand allowing the user to freely adjust height and tilting angle of an object on the supporting stand according to demand.

The supporting stand of the invention includes a base and a bracket. The base has a sliding rail structure, and the sliding rail structure includes a first rail and a second rail. The bracket is slidably disposed on the sliding rail structure and adapted to slide along the first rail and the second rail. When the bracket slides along the first rail, the bracket moves upward or downward, and when the bracket slides along the second rail, a tilting angle of the bracket relative to the base is changed.

In one embodiment of the invention, an extending direction of the first rail is parallel to the gravity direction, and an extending direction of the second rail is not parallel to the gravity direction.

In one embodiment of the invention, the second rail is an arc-shaped rail.

In one embodiment of the invention, the supporting stand includes a sliding member, wherein the bracket is connected to the sliding member and slidably disposed on the sliding rail structure by the sliding member.

In one embodiment of the invention, the first rail and the second rail from a continuous rail, the sliding member is adapted to slide from the first rail to the second rail.

In one embodiment of the invention, the sliding member includes two distal ends and slidably disposed on the sliding rail structure by the two distal ends, and the two distal ends are respectively located at different positions on the sliding rail structure.

In one embodiment of the invention, the sliding member includes a main body and at least one roller, the roller pivots on the main body, and two ends of the roller are adapted to roll along the sliding rail structure.

In one embodiment of the invention, the sliding member has at least one bearing, the bearing is disposed between the roller and main body.

In one embodiment of the invention, the sliding rail structure has two toothed racks, the roller is engaged with the two toothed racks and adapted to roll along the two toothed racks synchronously.

In one embodiment of the invention, the supporting stand includes an elastic member, wherein the elastic member is connected between the base and the sliding member, the bracket and the sliding member are adapted to resist an elastic force of the elastic member with gravity force to move downward along the sliding rail structure, and the elastic force of the elastic member is adapted to resist the gravity force to assist the bracket and the sliding member to move upward along the sliding rail structure.

In one embodiment of the invention, the first rail and the second rail are independent of each other, the sliding member includes a first sliding portion and a second sliding portion and are slidably disposed on the first rail and the second rail by the first sliding portion and the second sliding portion, respectively, and when the first sliding portion slides along the first rail, the second sliding portion slides along the second rail.

In one embodiment of the invention, the first sliding portion includes a sliding bar and a pivot member, the sliding bar is slidably disposed on the first rail, the pivot member pivots on the sliding bar, and when the sliding bar slides along the first rail, the pivot member rotates relative to the sliding bar.

In one embodiment of the invention, while the first sliding portion slides along the first rail, at least a part of the first sliding portion is adapted to be hidden inside the first rail.

Based on the above, in the supporting stand of the invention, the sliding rail structure includes the first rail and the second rail, the first rail is configured to adjust the height of the bracket, and the second rail is configured to adjust the tilting angle of the bracket. The user can slide the bracket along the first rail, along the second rail, or along both the first rail and the second rail, so as to freely adjust the height and the tilting angle of the object on the bracket according to demand, so that the object (such as a flat display screen, an AIO PC, or other appropriate devices) can be suitably used in many more situations.

In order to make the aforementioned and other features and advantages of the invention more comprehensible, embodiments accompanying figures are described in detail belows.

DESCRIPTION OF THE EMBODIMENTS

Figure 1A:
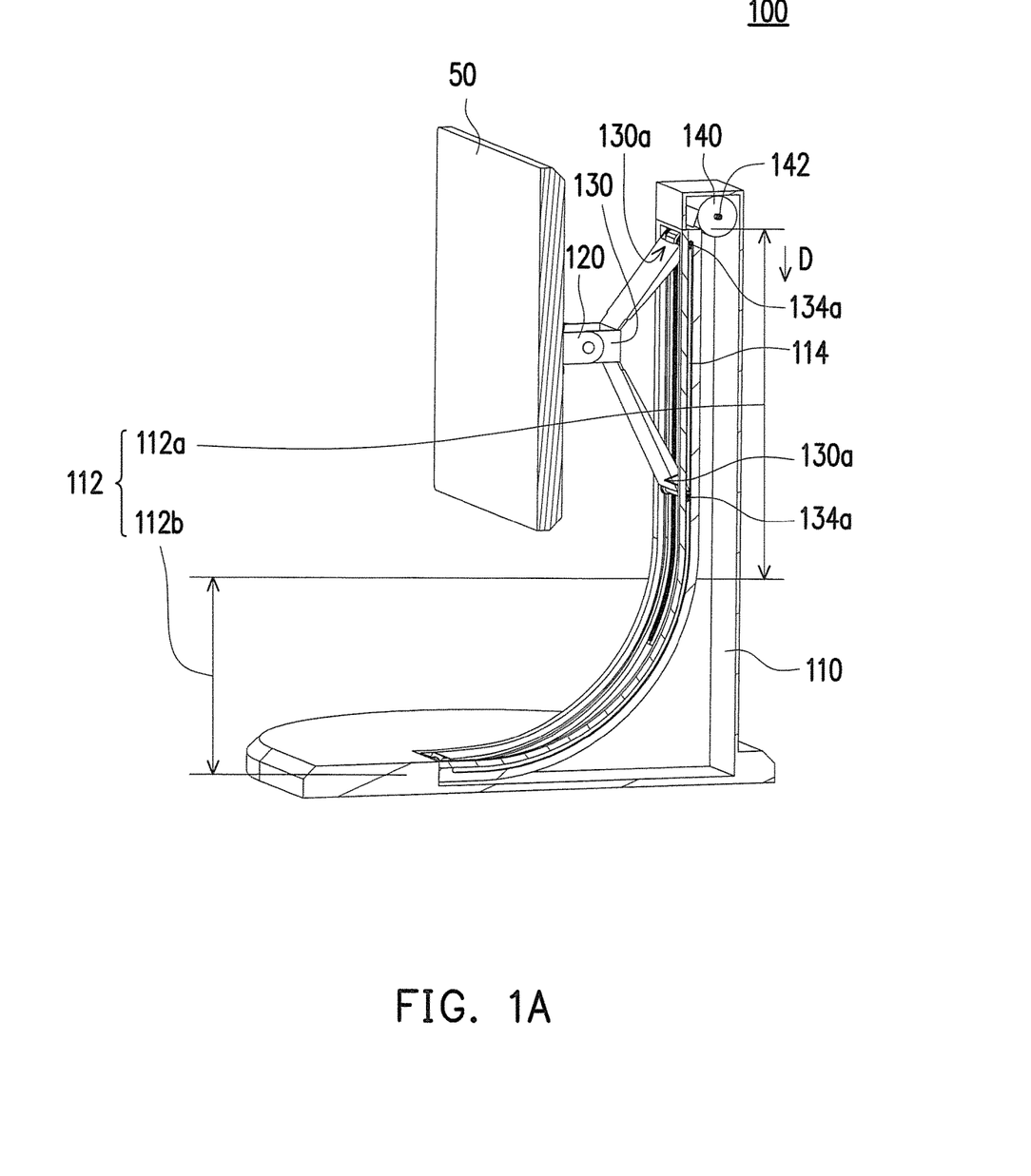
FIG. 1A is a partial three dimensional structural view of a supporting stand in one embodiment of the invention.
Figure 1B:
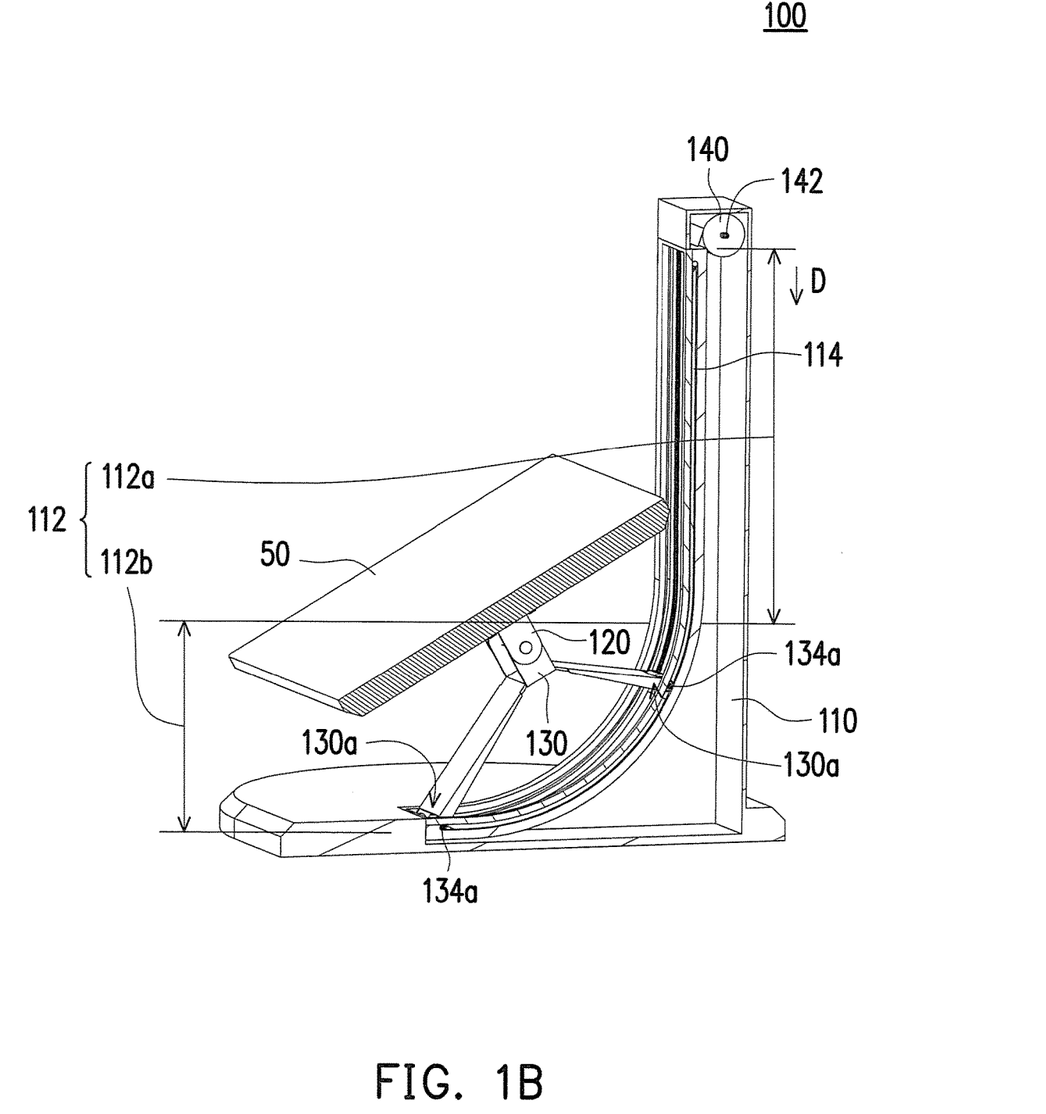
FIG. 1B is a schematic view depicting a bracket in FIG. 1A moving downward.
Figure 2:
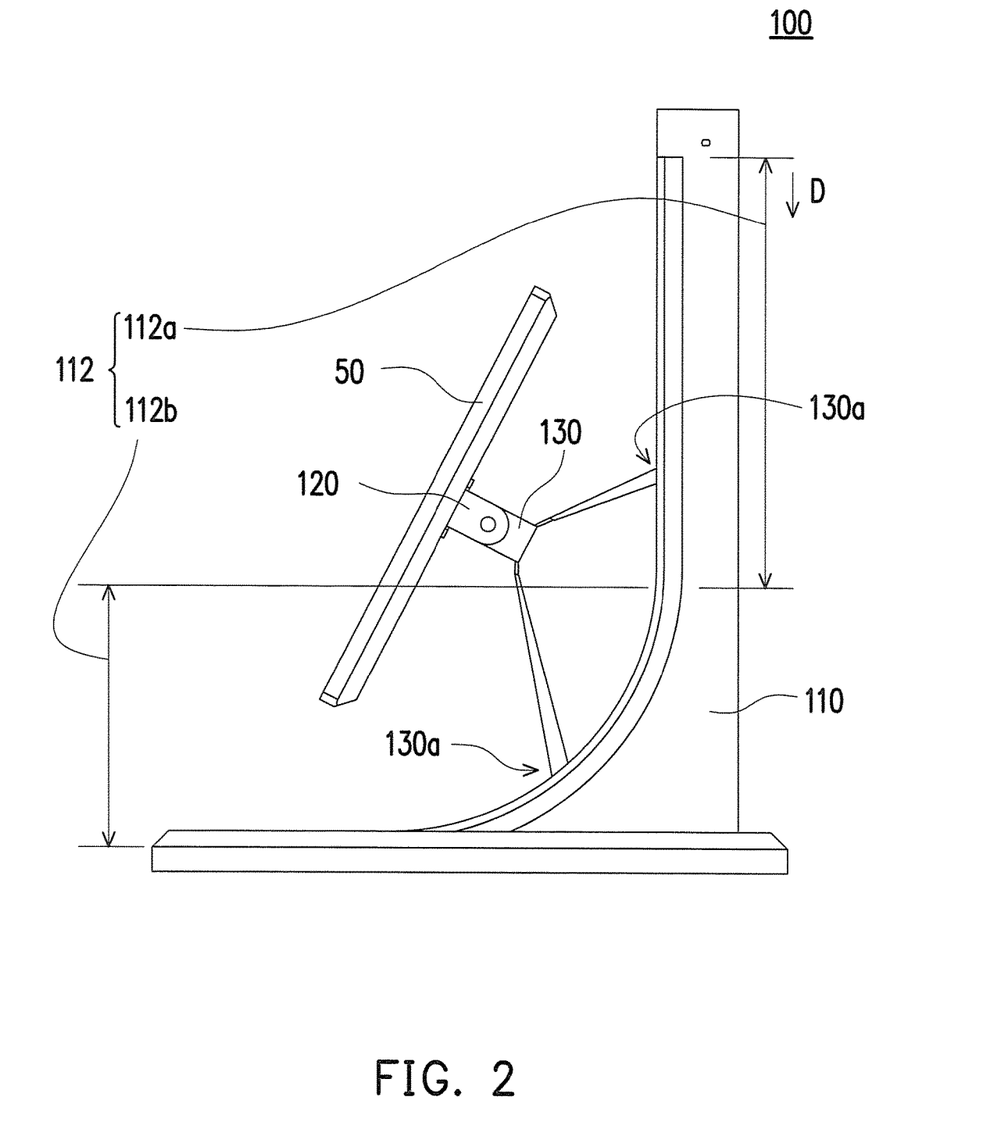
FIG. 2 is a side view of the bracket in FIG. 1A being simultaneously located on a first rail and a second rail.

FIG. 1A is a partial three dimensional structural view of a supporting stand in one embodiment of the invention. FIG. 1B is a schematic view depicting a bracket in FIG. 1A moving downward. FIG. 2 is a side view of the bracket in FIG. 1A being simultaneously located on a first rail and a second rail. Referring to FIG. 1A, FIG. 1B, and FIG. 2, a supporting stand 100 in the present embodiment includes a base 110, a bracket 120, and a sliding member 130. The base 110 has a sliding rail structure 112, and the sliding rail structure 112 includes a first rail 112a and a second rail 112b. The bracket 120 is connected to the sliding member 130 and slidably disposed on the sliding rail structure 112 by the sliding member 130, and the bracket 120 is adapted to slide along the first rail 112a, along the second rail 112b, or along both the first rail 112a and the second rail 112b at the same time.

Specifically, the first rail 112a and the second rail 112b in the present embodiment form a continuous rail, the sliding member 130 includes two distal ends 130a and slidably disposed on the sliding rail structure 112 by the two distal ends 130a. The sliding member 130 is adapted to slide from the first rail 112a to the second rail 112b as shown in FIG. 1A to FIG. 1B or to slide from the second rail 112b to the first rail 112a as shown in FIG. 1B to FIG. 1A. Moreover, when the two distal ends 130a of the sliding member 130 are respectively located on the first rail 112a and the second rail 112b as shown in FIG. 2 and the two distal ends 130a slide along the first rail 112a and the second rail 112b respectively, the bracket 120 and the sliding member 130 can be considered as sliding along the first rail 112a and the second rail 112b at the same time.

In the present embodiment, the first rail 112a is, for example, a straight rail, an extending direction of the first rail 112a is parallel to the gravity direction D, the second rail 112b is, for instance, an arc-shaped rail, and an extending direction of the second rail 112b is not parallel to the gravity direction D. Accordingly, when the bracket 120 and the sliding member 130 slide along the first rail 112a, the bracket 120 and the sliding member 130 move upward or downward relative to the base 110, and when the bracket 120 and the sliding member 130 slide along the second rail 112b, a tilting angle of the bracket 120 relative to the base 110 is changed.

Based on the above-mentioned configuration and operating method, the first rail 112a is configured to adjust the height of the bracket 120, and the second rail 112b is configured to adjust the tilting angle of the bracket 120. The user can slide the bracket 120 along the first rail 112a, along the second rail 112b, or along both the first rail 112a and the second rail 112b simultaneously, so as to freely adjust the height and the tilting angle of the object 50 on the bracket 120 according to demand, so that the object 50 (such as a flat display screen, an AIO PC, or other appropriate devices) can be suitably used in many more situations. In other embodiments, the object 50 may be other appropriate devices, the invention is not limited thereto.

Furthermore, the sliding member 130 in the present embodiment has a "<" shape and supports the bracket 120 to be distant from the sliding rail structure 112 by the two distal ends 130a, so as to prevent the object 50 from colliding with the supporting stand 100 in the moving process. In addition, since the two distal ends 130a of the sliding member 130 are respectively located at different positions on the sliding rail structure 112, the bracket 120 may be stably supported on the sliding rail structure 112 by the two distal ends 130a of the sliding member 130, and the bracket 120 may be guided by the two distal ends 130a of the sliding member 130 to slide smoothly along the sliding rail structure 112.

Figure 3:
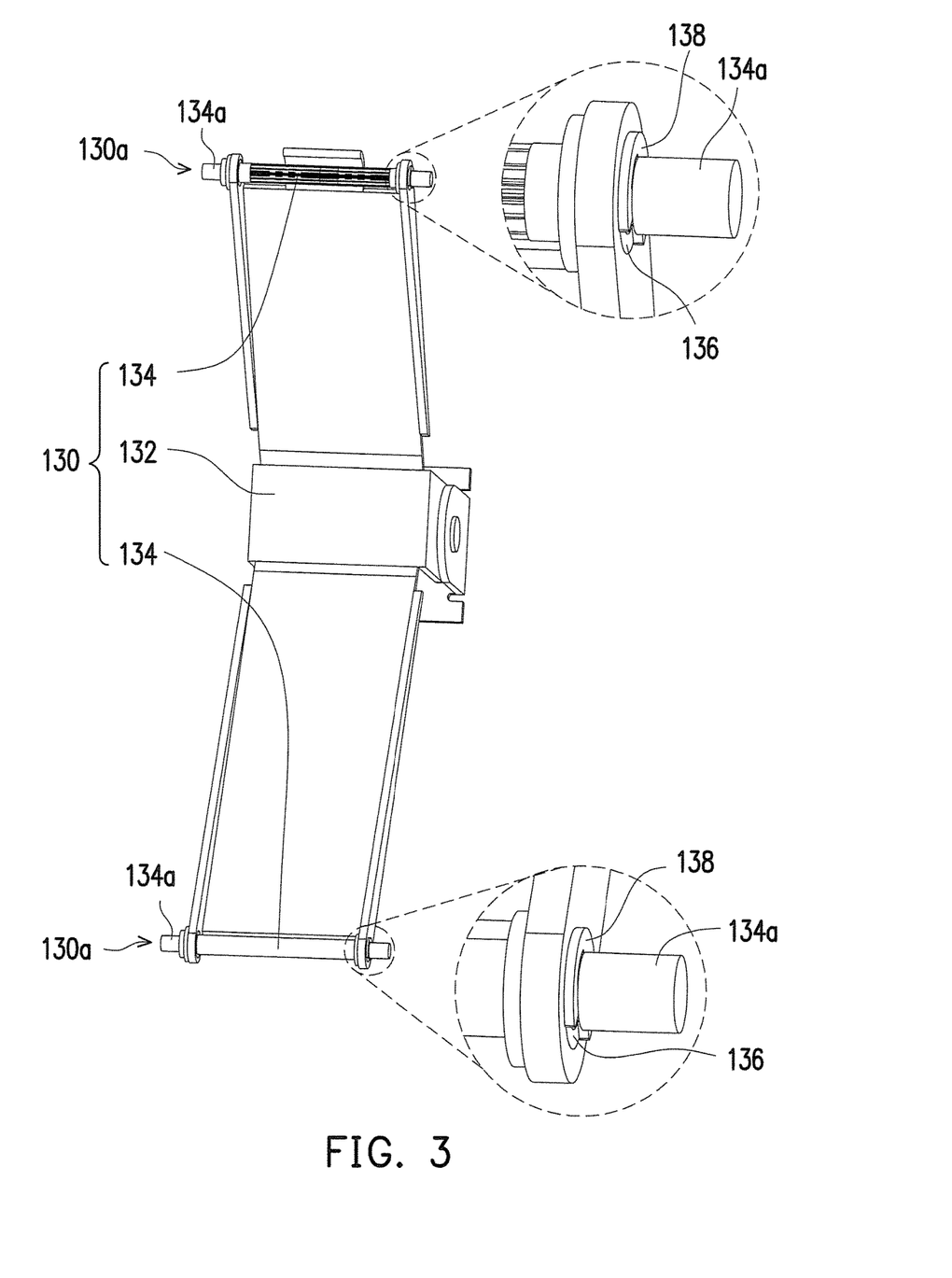
FIG. 3 is a three dimensional view of the bracket and a sliding member in FIG. 1A.
Figure 4:
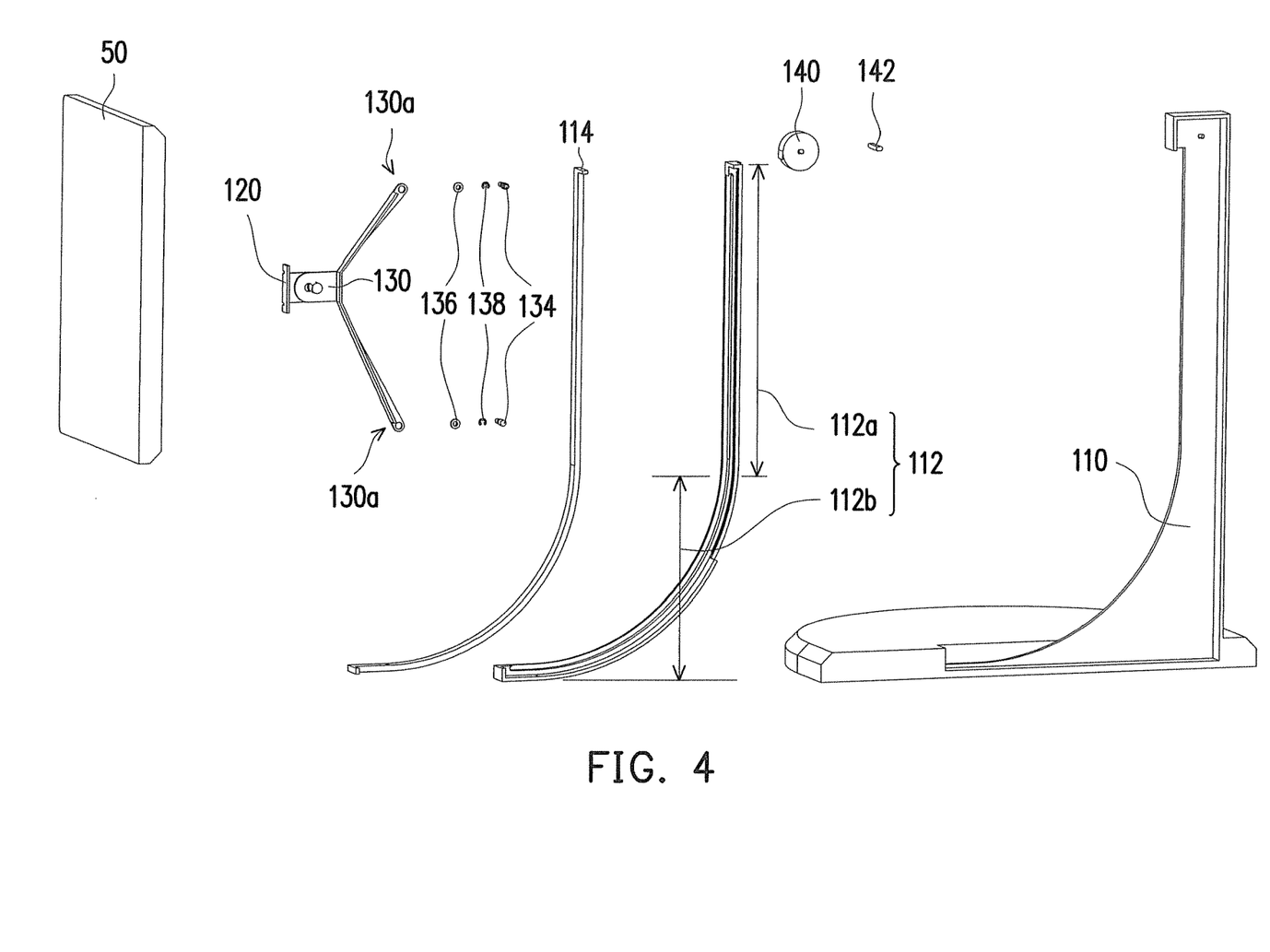
FIG. 4 is a partial exploded structural view of the supporting stand and an object in FIG. 1A.

FIG. 3 is a three dimensional view of the bracket and a sliding member in FIG. 1A. FIG. 4 is a partial exploded structural view of the supporting stand and an object in FIG. 1A. Referring to FIG. 1A, FIG. 3, and FIG. 4, in the present embodiment, the sliding member 130 includes a main body 132 and at least one roller 134 (depicted as two), the roller 134 pivots on the main body 132 and are respectively located at the two distal ends 130a of the sliding member 130, and two ends 134a of the roller 134 are adapted to roll along the sliding rail structure 112, so as to guide the sliding member 130 to move stably on the sliding rail structure 112. Referring to FIG. 1A and FIG. 4, the base 110 has a position limiting bar 114, the position limiting bar 114 is configured to limit the two ends 134a of the roller 134 on the sliding rail structure 112, so as to prevent the roller 134 detaching from the sliding rail structure 112. Referring to FIG. 3 and FIG. 4, the sliding member 130 has a plurality of bearings 136, the bearing 136 is disposed between the roller 134 and the main body 132, so that the roller 134 is able to roll relative to the main body 132 smoothly. In addition, the sliding member 130 of the present embodiment has a plurality of position limiting members 138 (such as a C-ring or an E-ring) configured to limit the two ends 134a of the roller 134 at the main body 132 and the bearing 136. In other embodiments, wear-resistant components may be sleeved on the two ends 134a of the roller 134, so as to reduce damage to the two ends 134a.

Figure 5A:
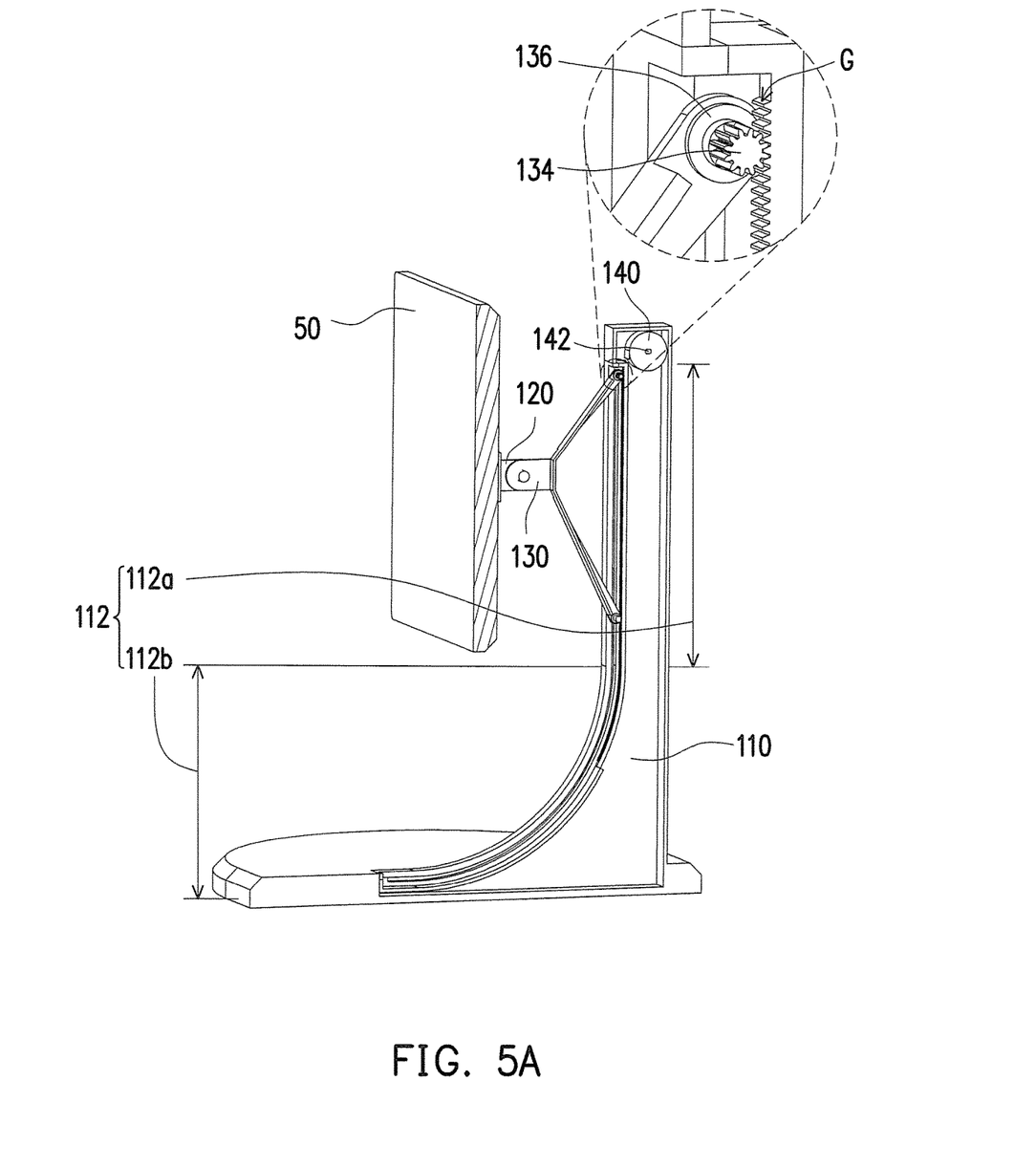
FIG. 5A is a partial three dimensional structural view of the supporting stand in FIG. 1A.
Figure 5B:
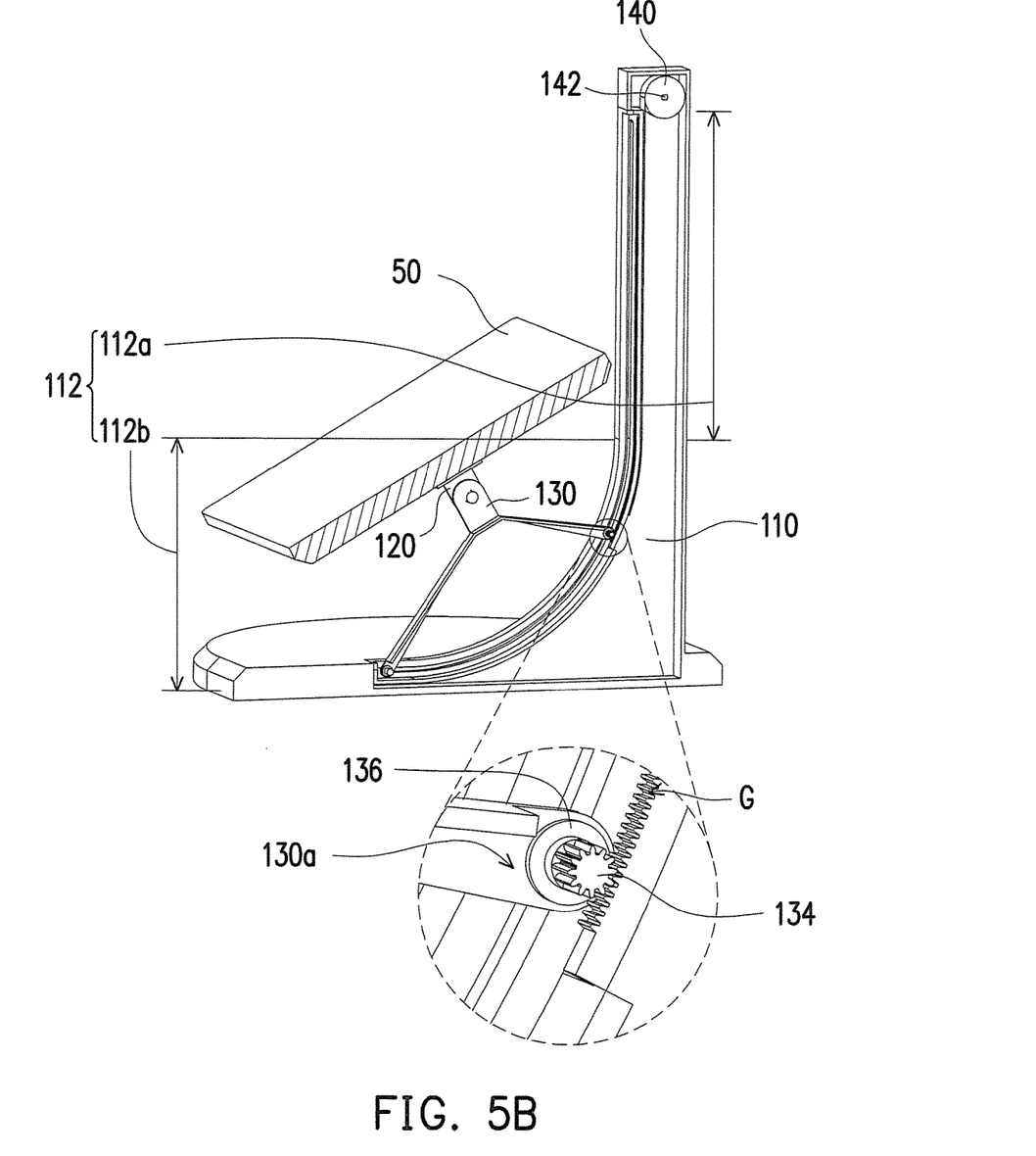
FIG. 5B is a partial three dimensional structural view of the supporting stand in FIG. 1B.
Figure 6:
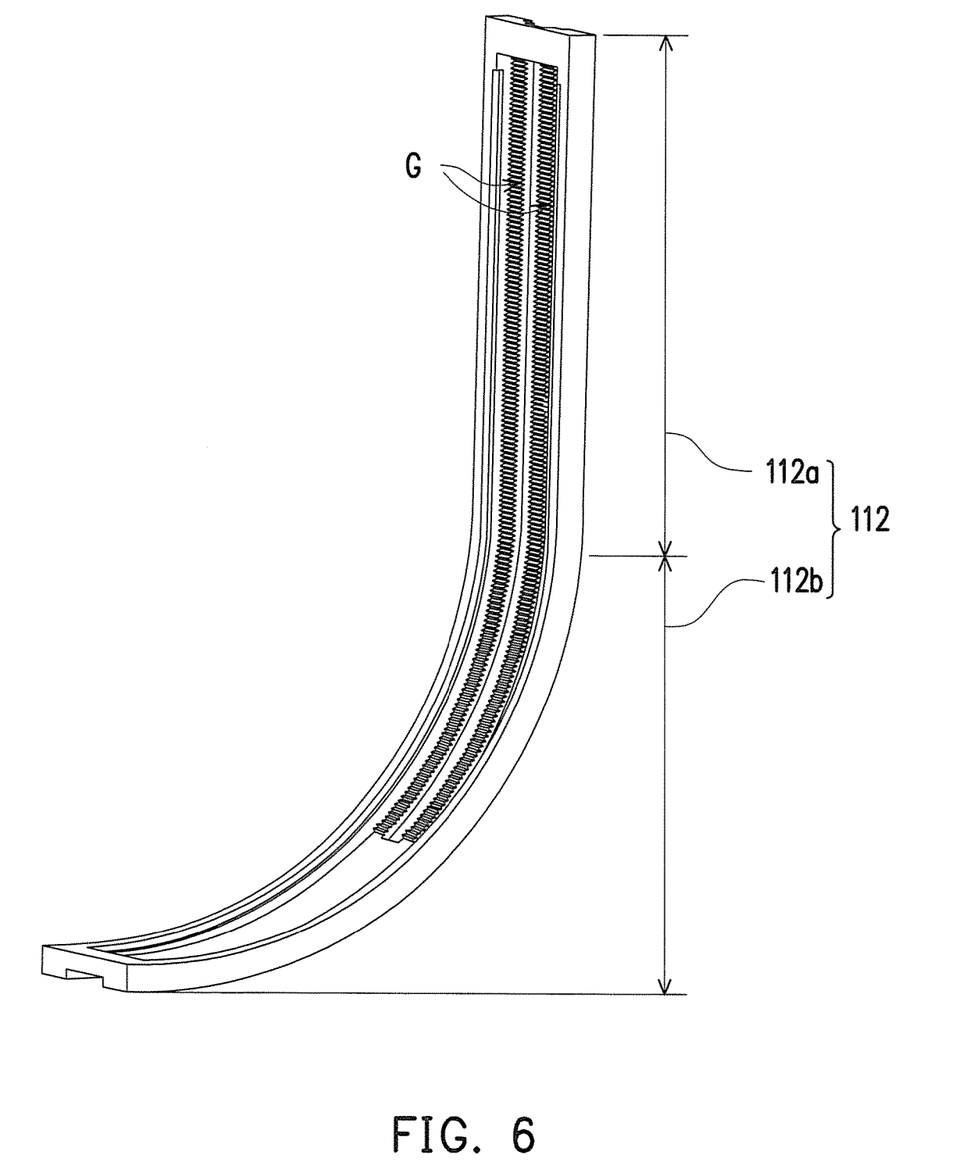
FIG. 6 is a three dimensional view of a sliding rail structure in FIG. 1A.

FIG. 5A is a partial three dimensional structural view of the supporting stand in FIG. 1A. FIG. 5B is a partial three dimensional structural view of the supporting stand in FIG. 1B. FIG. 6 is a three dimensional view of a sliding rail structure in FIG. 1A. Referring to FIG. 5A, FIG. 5B, and FIG. 6, the sliding rail structure 112 of the present embodiment has two toothed racks G, the surface of the at least one roller 134 has a gear structure to engage with the two toothed racks G and the at least one roller 134 is adapted to roll along the two toothed racks G synchronously. Accordingly, when the roller 134 rolls along the sliding rail structure 112, the roller 134 may be prevented from having different rolling speeds on the left and right sides which results in skew of the bracket 120 and the object 50 on the bracket 120.

In the present embodiment, the supporting stand 100 includes an elastic member 140, the elastic member 140 is, for example, a coil spring and connected between the base 110 and the sliding member 130. The bracket 120 and sliding member 130 are adapted to resist the elastic force of the elastic member 140 with gravity force to move downward along the sliding rail structure 112, and the elastic force of the elastic member 140 is adapted to resist the gravity force to assist the bracket 120 and the sliding member 130 to move upward along the sliding rail structure 112, so the user is able to adjust the height and the tilting angle of the object 50 effortlessly. In other embodiments, the elastic member may not be used, the invention is not limited thereto.

Figure 7:
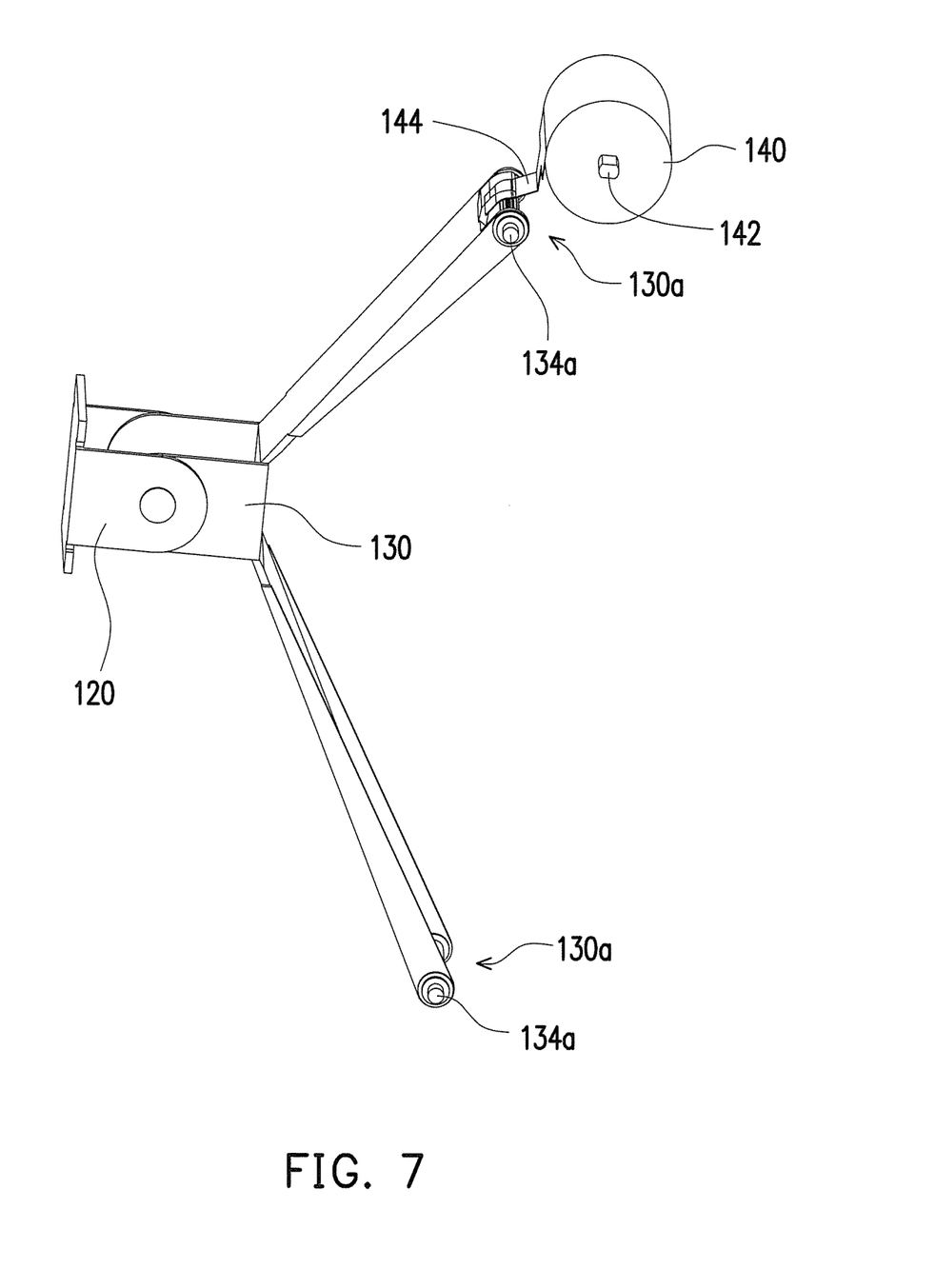
FIG. 7 is a three dimensional view of the bracket, the sliding member, and an elastic member in FIG. 1A.

FIG. 7 is a three dimensional view of the bracket, the sliding member, and an elastic member in FIG. 1A. Referring to FIG. 7, the elastic member 140 of the present embodiment is connected to the base 110 by a shaft 142 (depicted in FIG. 1A), connected to the sliding member 130 by a connecting end 144, and able to extend or rewind between the base 110 and the sliding member 130. In other embodiments, the elastic member 140 may not be a coil spring and may be another appropriate type of elastic member, and the elastic member 140 is connected to the base 110 and the sliding member 130 by other appropriate methods, the invention is not limited thereto.

Figure 8A:
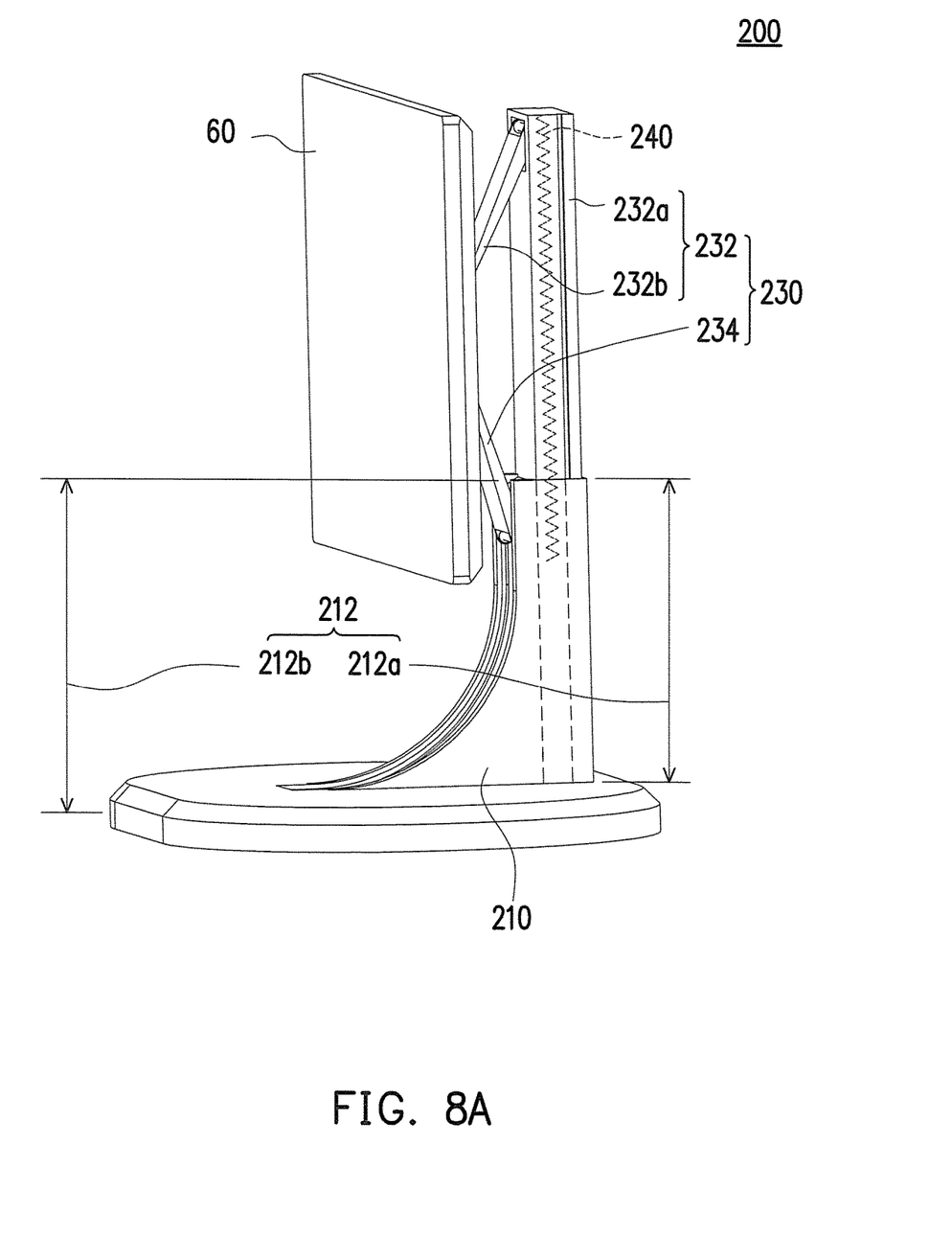
FIG. 8A is a three dimensional view of a supporting stand in another embodiment of the invention.
Figure 8B:
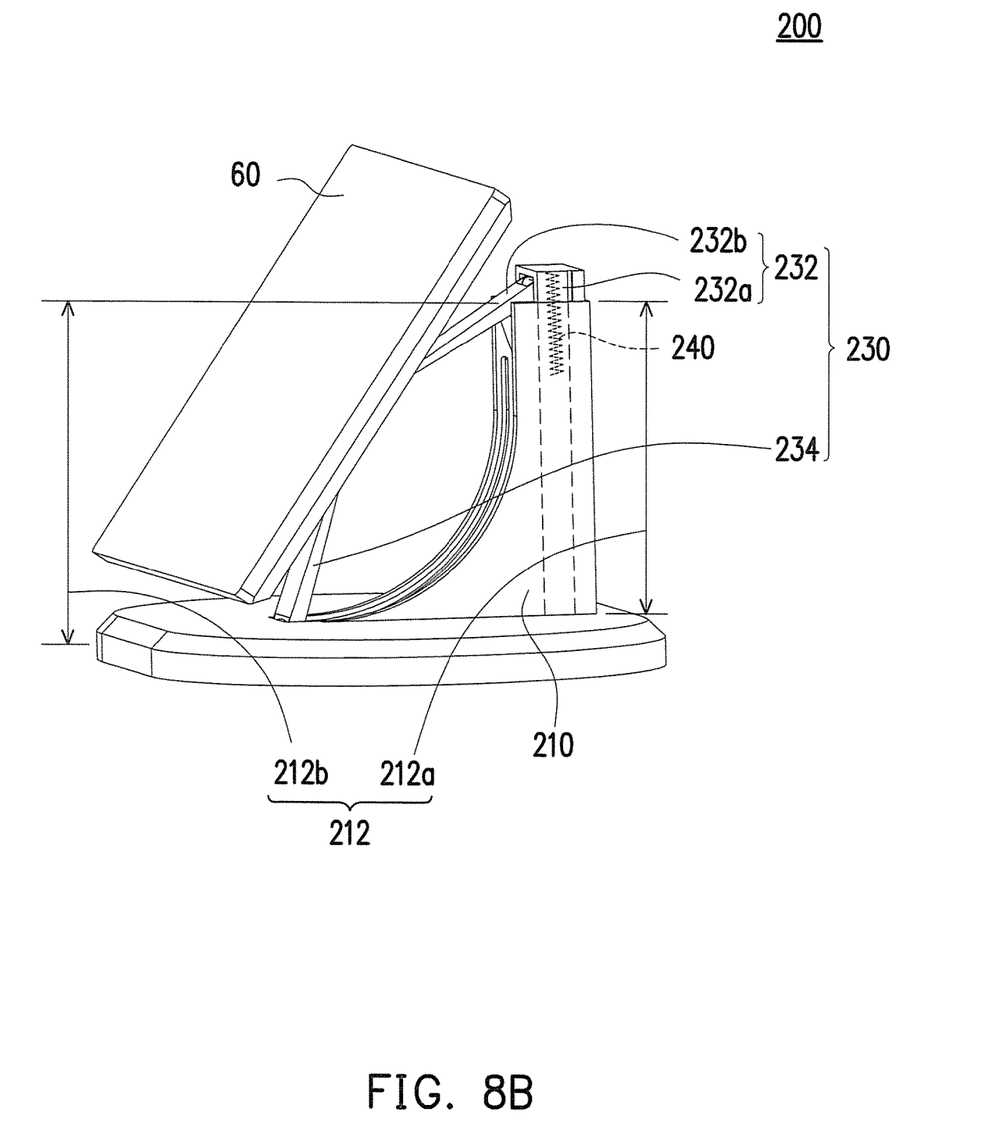
FIG. 8B is a schematic view depicting a bracket in FIG. 8A moving downward.

FIG. 8A is a three dimensional view of a supporting stand in another embodiment of the invention. FIG. 8B is a schematic view depicting a bracket in FIG. 8A moving downward. In an supporting stand 200 of FIG. 8A and FIG. 8B, the height and the tilting angle of the object 60 may be adjusted by the first rail 212a and the second rail 212b of the sliding rail structure 212 of the base 210, which is similar to adjusting the height and the tilting angle of the object 50 by the first rail 112a and the second rail 112b of the sliding rail structure 112 of the base 110 in FIG. 1A and FIG. 1B, so the details will not be repeated hereinafter.

The difference between the supporting stand 200 and the supporting stand 100 is that the first rail 212a and the second rail 212b are independent of each other. Namely, the first rail 212a and the second rail 212b do not form a continuous rail as the first rail 112a and the second rail 112b in FIG. 1A and FIG. 1B. The sliding member 230 includes a first sliding portion 232 and a second sliding portion 234 and is slidably disposed on the first rail 212a and the second rail 212b by the first sliding portion 232 and the second sliding portion 234, respectively. When the first sliding portion 232 slides along the first rail 212a, the second sliding portion 234 also slides along the second rail 212b at the same time. More specifically, in the present embodiment, the first sliding portion 232 includes a sliding bar 232a and a pivot member 232b, the sliding bar 232a is slidably disposed on the first rail 212a, the pivot member 232b pivots on the sliding bar 232a. When the sliding bar 232a slides along the first rail 212a, the pivot member 232b rotates relative to the sliding bar 232a, so the whole mechanism is able to operate smoothly. While the sliding bar 232a of the first sliding portion 232 slides along the first rail 212a, most of the sections of the sliding bar 232a of the first sliding portion 232 are hidden inside the first rail 212a, as shown in FIG. 8B. Accordingly, when the object 60 is located at a lower position, as shown in FIG. 8B, the sliding bar 232a is prevented from protruding out, which affect the appearance of the supporting stand 200.

Moreover, in the present embodiment, the supporting stand 200 may include an elastic member 240, the elastic member 240 is, for example, a compression spring and connected between the base 210 and the sliding bar 232a of the sliding member 230. The sliding member 230 is adapted to resist the elastic force of the elastic member 240 with gravity force to move downward along the sliding rail structure 212, and the elastic force of the elastic member 240 is adapted to resist the gravity force to assist the bracket 220 and the sliding member 230 to move upward along the sliding rail structure 212, so the user is able to adjust the height and the tilting angle of the object 60 effortlessly.

To sum up, in the supporting stand of the invention, the sliding rail structure includes the first rail and the second rail, the first rail is configured to adjust the height of the bracket, and the second rail is configured to adjust the tilting angle of the bracket. The user can slide the bracket along the first rail, along the second rail, or along both the first rail and the second rail, so as to freely adjust the height and the tilting angle of the object on the bracket according to demand, so that the object (such as a flat display screen, an AIO PC, or other appropriate devices) can be suitably used in many more situations.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. A supporting stand, comprising:
   a base, having a bottom portion and a sliding rail structure disposed on the bottom portion, wherein the sliding rail structure comprises a first rail and a second rail which are independent of each other;
   a sliding member, comprising a first sliding portion and a second sliding portion and slidably disposed on the first rail and the second rail by the first sliding portion and the second sliding portion, respectively, and when the first sliding portion slides along the first rail, the second sliding portion slides along the second rail; and
   a bracket, connected to the sliding member and slidably disposed on the sliding rail structure by the sliding member and adapted to slide along the first rail and the second rail, wherein when the bracket slides along the first rail, the bracket moves upward or downward relative to the base, and when the bracket slides along the second rail, a tilting angle of the bracket relative to the base is changed,
   wherein the first rail is a straight rail, the second rail is a concave arc-shaped rail and is concave upward while the bottom portion is located below the sliding rail structure, and the bracket is adapted to slide along both the straight rail and the arc-shaped rail at the same time,
   wherein the first sliding portion comprises a sliding bar and a pivot member, the sliding bar is slidably disposed on the first rail, the pivot member pivots on the sliding bar, and when the sliding bar slides along the first rail, the pivot member rotates relative to the sliding bar.

2. The supporting stand as recited in claim 1, wherein an extending direction of the first rail is parallel to a gravity direction, and an extending direction of the second rail is not parallel to the gravity direction.

3. The supporting stand as recited in claim 1, wherein the sliding member comprises two distal ends and is slidably disposed on the sliding rail structure by the two distal ends, and the two distal ends are respectively located at different positions on the sliding rail structure.

4. The supporting stand as recited in claim 1, wherein the sliding member comprises a main body and at least one roller, the roller pivots on the main body, and two ends of the roller are adapted to roll along the sliding rail structure.

5. The supporting stand as recited in claim 4, wherein the sliding member has at least one bearing, the bearing is disposed between the roller and main body.

6. The supporting stand as recited in claim 4, wherein the sliding rail structure has two toothed racks, the roller is engaged with the two toothed racks and adapted to roll along the two toothed racks synchronously.

7. The supporting stand as recited in claim 1, comprising an elastic member, wherein the elastic member is connected between the base and the sliding member, the bracket and the sliding member are adapted to resist an elastic force of the elastic member with gravity force to move downward along the sliding rail structure, and the elastic force of the elastic member is adapted to resist the gravity force to assist the bracket and the sliding member to move upward along the sliding rail structure.

8. The supporting stand as recited in claim 1, wherein while the first sliding portion slides along the first rail, at least a part of the first sliding portion is adapted to be hidden inside the first rail.

9. A supporting stand, comprising:
- a base, having a sliding rail structure, wherein the sliding rail structure comprises a first rail and a second rail which are independent of each other;
- a bracket, slidably disposed on the sliding rail structure and adapted to slide along the first rail and the second rail, wherein when the bracket slides along the first rail, the bracket moves upward or downward relative to the base, and when the bracket slides along the second rail, a tilting angle of the bracket relative to the base is changed; and
- a sliding member, comprising a first sliding portion and a second sliding portion and slidably disposed on the first rail and the second rail by the first sliding portion and the second sliding portion, respectively, and when the first sliding portion slides along the first rail, the second sliding portion slides along the second rail, wherein the bracket is connected to the sliding member and slidably disposed on the sliding rail structure by the sliding member, wherein the first rail is a straight rail, wherein the first sliding portion comprises a sliding bar and a pivot member, the sliding bar is slidably disposed on the first rail, the pivot member pivots on the sliding bar, and when the sliding bar slides along the first rail, the pivot member rotates relative to the sliding bar, the sliding member comprises two distal ends, and the two distal ends is able to be simultaneously located at the first rail, able to be simultaneously located at the second rail, and able to be respectively located at the first rail and the second rail.

\* \* \* \* \*